(12) United States Patent
Dietrich et al.

(10) Patent No.: US 10,845,833 B1
(45) Date of Patent: Nov. 24, 2020

(54) METHOD AND SYSTEM FOR BUCK CONVERTER CURRENT RE-USE FOR MINIMUM SWITCHING FREQUENCY PULSE-SKIP OPERATION

(71) Applicant: Texas Instruments Incorporated, Dallas, TX (US)

(72) Inventors: Stefan Dietrich, Freising (DE); Christian Harder, Freising (DE); Emil Cioran, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/653,272

(22) Filed: Oct. 15, 2019

(51) Int. Cl.
  G05F 1/56 (2006.01)
  G05F 1/565 (2006.01)
  H02M 1/00 (2006.01)
  H02M 3/158 (2006.01)

(52) U.S. Cl.
  CPC ............ G05F 1/565 (2013.01); H02M 3/158 (2013.01); *H02M 2001/0006* (2013.01); *H02M 2001/0016* (2013.01); *H02M 2001/0032* (2013.01); *H02M 2001/0045* (2013.01); *H02M 2001/0054* (2013.01)

(58) Field of Classification Search
  CPC . H02M 2001/0006; H02M 2001/0045; H02M 2001/0016; H02M 2001/0032; H02M 2001/0054; H02M 3/158; G05F 1/56; G05F 1/565
  See application file for complete search history.

(56) References Cited

U.S. PATENT DOCUMENTS

| | | | |
|---|---|---|---|
| 7,245,113 B2 | 7/2007 | Chen et al. | |
| 9,219,411 B2 | 12/2015 | Henzler | |
| 9,276,477 B2 | 3/2016 | Thomas et al. | |
| 9,722,482 B2 * | 8/2017 | de Cremoux | H02M 1/08 |
| 9,742,268 B2 * | 8/2017 | Wang | H02M 3/156 |
| 9,800,152 B2 * | 10/2017 | Corleto | H02M 3/156 |
| 10,291,126 B1 | 5/2019 | Wei et al. | |
| 2011/0018516 A1 * | 1/2011 | Notman | H02M 3/1588 323/284 |
| 2017/0248980 A1 * | 8/2017 | Hanson | H02M 3/158 |

(Continued)

FOREIGN PATENT DOCUMENTS

WO  WO-2015047276 A1 * 4/2015 ............... G05F 1/56

*Primary Examiner* — Thienvu V Tran
*Assistant Examiner* — Sisay G Tiku
(74) *Attorney, Agent, or Firm* — Ray A. King; Charles A. Brill; Frank D. Cimino (57) ABSTRACT

A buck voltage converter comprising a high side switch, a low side switch, a capacitor, an inductor, a gate driver circuit having outputs coupled to the gate terminal of the high side switch and the gate terminal of the low side switch, and a separate voltage regulator circuit that powers circuitry internal to the buck voltage converter. The voltage regulator circuit includes a multiplexer having a first multiplexer input coupled to the input voltage source, a second multiplexer input coupled to the buck output of the buck voltage converter, and one or more multiplexer control inputs to select which of the two multiplexer inputs is coupled to a multiplexer output and pass transistor having a first terminal coupled to the multiplexer output of the multiplexer and having a second terminal coupled to the regulator output of the voltage regulator.

20 Claims, 5 Drawing Sheets

(56) References Cited

U.S. PATENT DOCUMENTS

2018/0166990 A1\* 6/2018 Gibson ............... H02M 3/1582
2018/0198416 A1\* 7/2018 Hur ...................... G05F 1/565
2019/0222109 A1 7/2019 Gambetta et al.
2019/0324483 A1\* 10/2019 Tan ......................... G05F 1/10

\* cited by examiner

FIG. 6

METHOD AND SYSTEM FOR BUCK CONVERTER CURRENT RE-USE FOR MINIMUM SWITCHING FREQUENCY PULSE-SKIP OPERATION

BACKGROUND

A buck converter is a DC-DC power converter that steps down or lowers the voltage between its input from the main power supply and its output while stepping up current. It is used in circuits where the DC output voltage needs to be lower than the DC input voltage. It is a switched-mode power supply typically comprised of at least two semiconductors, which could be two transistors, which make up a high side switch coupled to the supply voltage and a low side switch coupled to ground. It is also comprised of at least one energy storage element, which could be a capacitor or an inductor, or the two in combination, which stores energy during high side conduction and discharges during low side conduction.

While the high side transistor is on, current is flowing through the load via the inductor. The reaction of the inductor is to oppose changes in current flow and also to store energy. The switching transistors between the input node and output node of the buck converter continually switch on and off at high frequency alternating between providing the supply voltage and ground. To maintain a continuous output, the circuit uses the energy stored in the inductor during the on periods of the high side switch, then filters it to smooth out the ripple.

In switching operation, buck converters have two modes: a discontinuous conduction mode (DCM) and a continuous conduction mode (CCM). In DCM, there is a period in which the inductor is discharged completely and the current is interrupted, while CCM is characterized by having no period where the inductor current is zero. CCM is more commonly used in DC-DC converters because it reduces the output ripple voltage and harmonics that arise from the discontinuities in current flow.

In the case of CCM, when the high side switch is off and the low side switch is on, a reverse current flows during the reverse recovery time from the energy stored in the inductor. Because one of the two switches is always switched on in CCM, there is no period where the inductor current is zero.

Design considerations for buck converters include maintaining an accurate output voltage within an acceptable tolerance, minimizing ripple voltage on the output, maximizing the power efficiency of the converter comparing the output power delivered to the input power sourced, maintaining a minimum switching frequency to avoid interfering with adjacent circuitry, and avoiding output voltage runaway. The last two requirements can sometimes be in conflict with each other at very light loads because the minimum switching frequency means that power has to continually be switched back into the circuit due to the minimum on time of the switch. This can lead to a situation where energy continues to be stored with no dissipation from a load, causing the output voltage to continue rising to a runaway condition.

SUMMARY

This Summary is provided to introduce the described concepts in a simplified form that are further described below in the Detailed Description including the drawings provided. This Summary is not intended to limit the claimed subject matter's scope.

Described embodiments include a DC-DC buck converter with a guaranteed minimum switching frequency during pulse-skip mode and a method for preventing output voltage runaway at zero load current by means of reusing energy that would otherwise be wasted to supply the internal low drop-out regulator (LDO) as an equivalent dummy load of the buck converter.

One example of the invention is a buck voltage converter operating in pulse-skip mode comprising a high side switch with a first terminal coupled to an input voltage source, an inductor with a first terminal coupled to a second terminal of the high side switch, and a second terminal coupled to the output of the buck voltage converter. The buck voltage converter is further comprised of a low side switch with a first terminal coupled to ground, and a second terminal coupled to the first terminal of the inductor and to the second terminal of the high side switch, a capacitor with a first terminal coupled to the output of the buck voltage converter and a second terminal coupled to ground, a gate driver circuit receiving inputs from a state machine and with outputs coupled to the gate terminal of the high side switch and gate terminal of the low side switch, and a voltage regulator circuit powering circuitry internal to the buck voltage converter.

The internal voltage regulator includes a multiplexer with a multiplexer output, a first input from the supply voltage source, a second input from the buck voltage converter output, and one or more control outputs derived from comparing the difference between the output of the buck voltage converter and the input voltage source which control the selection of which input is coupled to the output, and a pass transistor with a first terminal coupled to the output of the multiplexer and a second terminal coupled to the output of the internal voltage regulator, in which the output of the internal voltage regulator circuit is the sole power source for the state machine circuitry and internal logic circuitry of the buck voltage converter.

BRIEF DESCRIPTION OF THE DRAWINGS

Like reference symbols in the various drawings indicate like elements. Details of one or more implementations of the present disclosure are set forth in the accompanying drawings and the description below. The figures are not drawn to scale and they are provided merely to illustrate the disclosure. Specific details, relationships, and methods are set forth to provide an understanding of the disclosure. Other features and advantages may be apparent from the description and drawings, and from the claims.

DETAILED DESCRIPTION

Figure 1:
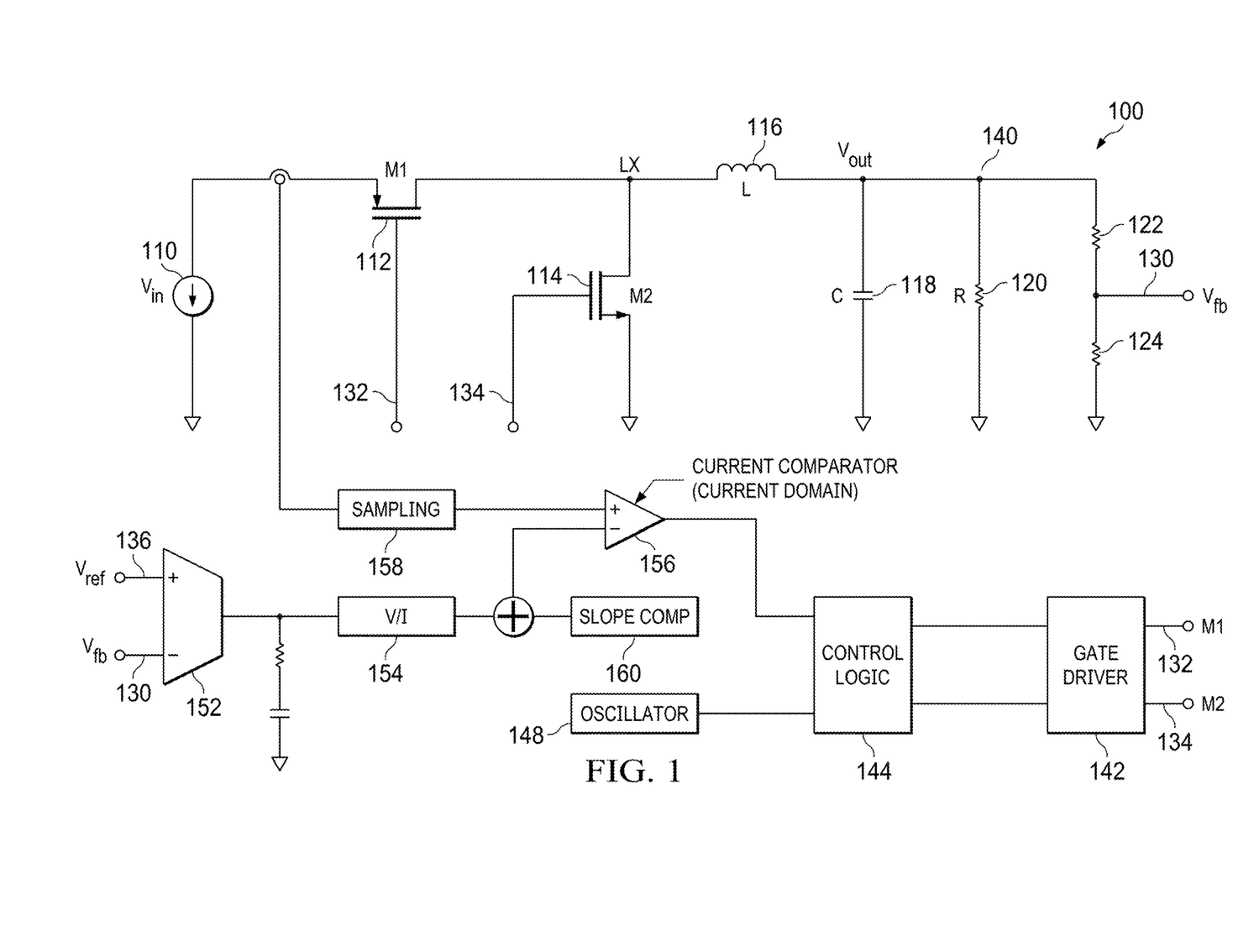
FIG. 1 shows a block diagram for an example of a current mode control DC-DC buck converter operating in CCM only.

FIG. 1 illustrates an example DC-DC buck converter. The buck converter includes an input voltage source 110 which could be a battery or some other type of DC power source. A typical voltage range for the input voltage source in one embodiment could be from 2.2V to 4.9V. The input voltage source 110 is coupled to the source of a PMOS transistor 112 which is the high side switch. The drain of transistor 112 is coupled to one terminal of an inductor 116 and to the drain of the low side switch, NMOS transistor 114, whose source is electrically connected to ground. The gates of 112 and 114 are controlled by output signals 132 and 134, respectively, of gate driver circuit 142. The other terminal of inductor 116 is coupled to one terminal of capacitor 118, whose other terminal is electrically connected to ground.

The buck converter load is represented by load resistor 120. The buck converter could be under a voltage control, current control, or a combination of both to regulate the output voltage $V_{OUT}$ at node 140 from the input voltage source $V_{IN}$ 110 under a certain load 120.

The buck converter further includes a control logic block 144 to control the gate driver circuit 142 that drives the gates of the high side switch 112 using signal 132 and the low side switch 114 using signal 134. The input to control logic block 144 is derived by comparing a feedback voltage 130 representative of the output voltage $V_{OUT}$ 140 to an internal reference voltage $V_{REF}$ 136 using comparator 152, converting it to a current using V/I converter 154 and comparing it to input current sample 158 using current comparator 156. The control logic block 144 is clocked by an oscillator 148 operating at a fixed frequency. In some embodiments, a current reference could be used in place of a voltage reference.

The basic operation of the buck converter is best understood in terms of the relation between current and voltage in the inductor. In the initial state, the high side switch 112 and the low side switch 114 are both off and the current flowing through the circuit and the voltage across the inductor 116 are zero. When the high side gate control signal 132 turns the high side switch 112 on, the voltage across the inductor is derived by subtracting the buck regulator output voltage 140 from the input voltage source 110 and causes the current to increase. During this time, energy is stored in the inductor 116 in the form of a magnetic field and the inductor current splits into a current flowing through the load resistance 120 and another current charging the output capacitor. Thus, energy from the input is transferred to three elements since it is stored in the inductor 116 and the output capacitor 118 and is dissipated in the load resistor 120.

The inductor current only increases when the voltage at the input voltage source 110 is higher than the buck regulator output voltage 140. Therefore, power can only be transferred from the input to the output continuously if the buck regulator output voltage 140 is smaller than the input voltage source 110.

When the high side gate control signal 132 turns off the high side switch 112, the input voltage source 110 will no longer provide energy to the circuit. The low side switch 114 is turned on to provide a low impedance path between the inductor 116 and ground. As the voltage across the inductor 116 immediately reverses to the negative buck regulator output voltage, its current will decrease and energy previously stored in the magnetic field gets transferred back from the capacitor 318 to the magnetic field. Then, at the beginning of the next switching cycle, energy gets transferred from the inductor 116 and capacitor 118 to the input voltage source 110. This is the normal operation if the current through the load resistor is less than half the ripple current of the inductor 116.

There are several different modes that a buck converter can operate in. Buck converters operate in continuous conduction mode (CCM) if there is never a period of time where the current through the inductor 116 is zero, meaning either the high side switch 112 or the low side switch 114 is always turned on. There is never a time when both the high side switch 112 and the low side switch 114 are off simultaneously in CCM. The boundary between CCM and DCM is called boundary or critical conduction mode.

In DCM operation, the switching frequency is typically identical to CCM operation such that losses related to the switching activity, for instance capacitive losses, remain constant. Since the output power in DCM can be very low but the switching losses do not drop, efficiency is typically lower than in CCM. This is because typically at low power, switching losses dominate over conduction losses related to the resistance of switches and the inductor. Pulse frequency modulation (PFM) can be used to minimize switching losses. PFM allows for the switching frequency to be reduced at light loads, thus preventing the inductor current from dropping below zero.

Most switched mode power supplies operate at a fixed frequency, using pulse-width-modulation to regulate the output. There is a minimum on-time for a FET, i.e. how long the FET must be on before it can be turned off again. At high switching frequencies and low duty-cycle, this may lead to pulse-skipping modes (PSM) of operation. PSM can achieve smaller harmonics, faster response speed and higher light-load efficiency than pulse-width-modulation or DCM operation.

With fixed-frequency control, PSM must have a regulated number of pulses skipped to prevent output voltage runaway at zero-load. To achieve a required minimum switching frequency (e.g. audible noise >60 KHz), the maximum number of skipped pulses must be limited and can be calculated with a given oscillator switching frequency by the equation Skip Frequency=Oscillator Frequency/Number Pulses As an example, using the audible noise threshold frequency of 60 KHz with an oscillator clock frequency of 1.5 MHz, the maximum number of pulses that can be skipped is 25.

60 KHz=1.5 MHz/Number Pulses

⇒ Max Number of Pulses to Skip=1.5 MHz/60 KHz=25

The buck converter closed loop frequency from the oscillator is much higher than the audible noise threshold frequency of 60 KHz, allowing a large number of skipped pulses in this case. However, there are applications in which the converter minimum frequency must be higher than audible noise, and even higher than the converter closed loop frequency to avoid disturbances of adjacent electrical circuits. For instance, in handheld devices, the capacitive touchscreens require a sample frequency of greater than 400 KHz to avoid unwanted noise in the sensitive frequency band. In these applications and at zero load current of the buck converter, the minimum number of pulses is strictly limited and an additional dummy load must be added to the buck converter to avoid an output voltage runaway.

In addition to the requirements of adjacent circuits, the high minimum switching frequency in PSM avoids burst-mode behavior due to repetitive forced switching of the power-stage. An added benefit of PSM is lower ripple on the output voltage, which is a requirement for voltage converters supplying displays.

Figure 2A:
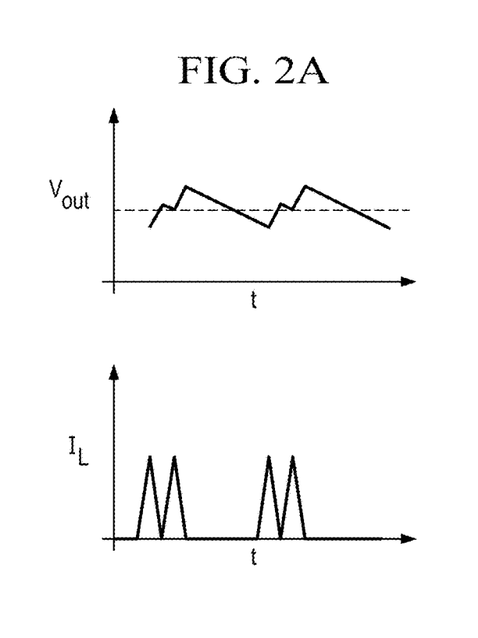
FIG. 2A shows voltage and current waveforms plotted as a function of time for a PSM scheme in burst mode with no load.
Figure 2B:
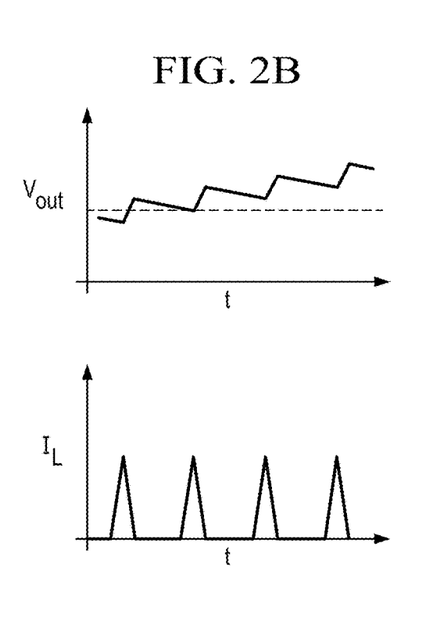
FIG. 2B shows voltage and current waveforms plotted as a function of time for a PSM scheme with no load.

FIG. 2A shows voltage and current waveforms plotted as a function of time for a PSM scheme in burst mode with no load. In the voltage plot, the dotted line shows the desired regulated DC voltage. This illustrates the drawback to burst mode that it results in high output voltage ripple, which can be unacceptable in some applications. FIG. 2B shows voltage and current waveforms plotted as a function of time for a PSM scheme with no load. The voltage ripple is much improved over the burst mode example, but with no load and a strict requirement to maintain a minimum switching frequency, the output voltage runs away and cannot be held within the desired DC voltage range because there is no mechanism to reduce the output voltage level without dropping below the minimum switching frequency.

Figure 2C:
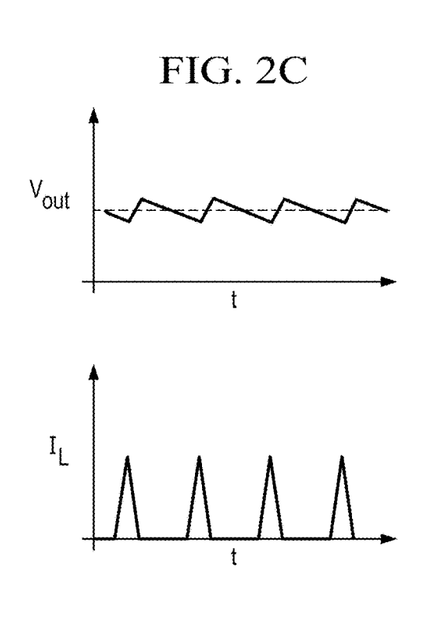
FIG. 2C shows voltage and current waveforms plotted as a function of time for a PSM scheme with a dummy load.

The prior art solution for this problem is to add an additional dummy load to avoid an output voltage runaway. FIG. 2C shows voltage and current waveforms plotted as a function of time for a PSM scheme with a dummy load. The dummy load technique achieves the correct output voltage accuracy and provides low output voltage ripple, but leads to low system power efficiency because the current going through the dummy load is wasted. In battery driven systems, having low standby power consumption is critical to save battery lifetime. With zero load current, the circuit being supplied by the buck converter is assumed to be operating in standby mode. In order for the buck converter to fulfill the minimum switching frequency requirement in a PSM scheme, prior-art converters use a dummy load to control the output voltage under minimum inductor on-time control. However, this has a major drawback because the wasted current through the dummy load reduces battery lifetime, which is undesirable in handheld electronic applications.

Figure 3:
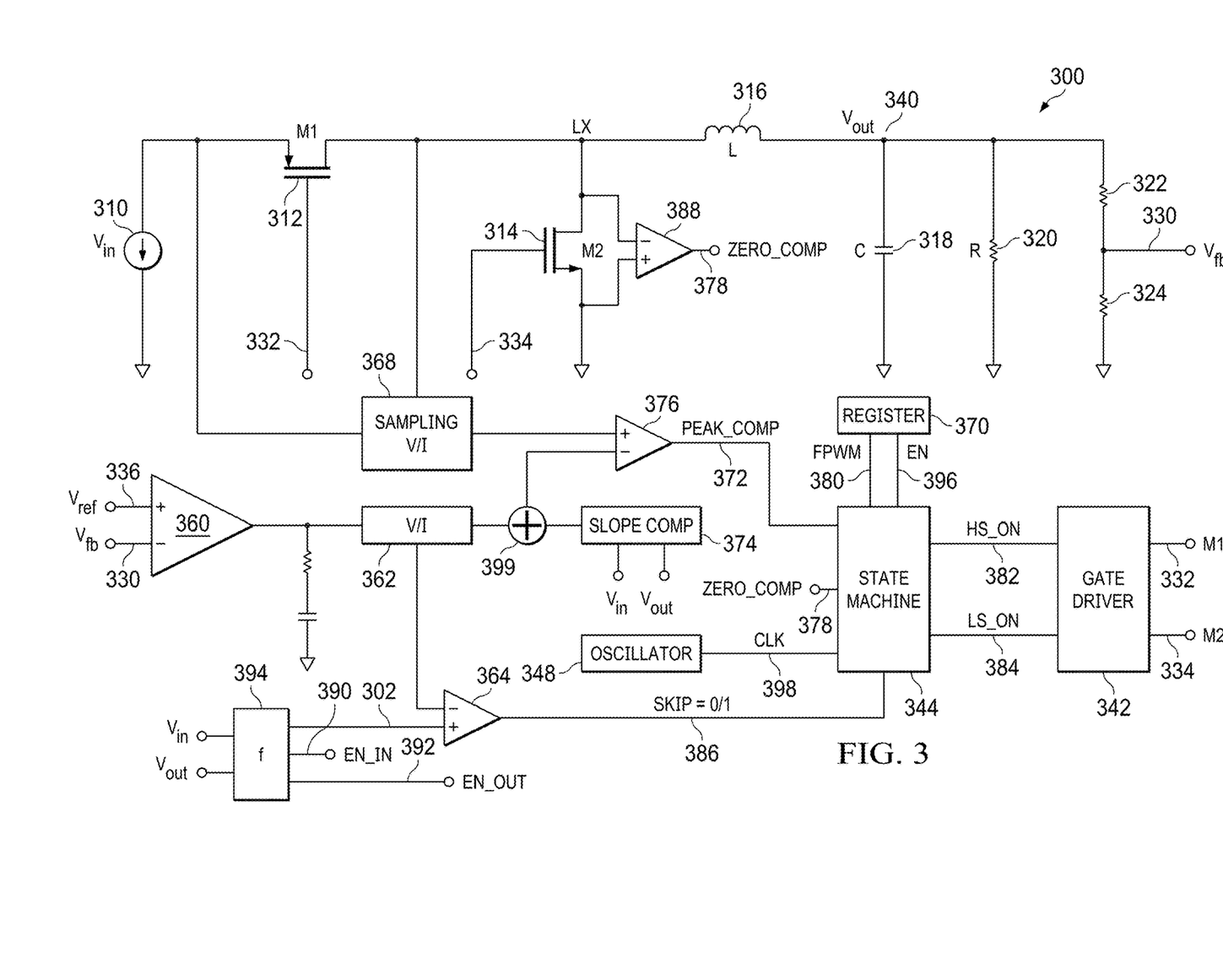
FIG. 3 shows a block diagram for an example of the claimed buck converter with an internally powered logic LDO.

FIG. 3 shows a block diagram for an example of the claimed buck converter with an internally powered logic LDO. It provides a means to prevent the output from voltage runaway at zero load current by re-using the charge otherwise wasted through a dummy load to supply the internal biasing low dropout regulator (LDO). Using the internal logic LDO as an alternative dummy load for the buck converter prevents output voltage runaway of the buck converter, and leads to an overall higher power supply efficiency and less battery current drawn to operate in standby or low-power operation. This is done by powering the logic LDO from the buck converter output rather than the battery when there is no other current draw from the buck converter output. However, the battery may still be used to power the logic LDO when there is a higher load on the buck converter output.

FIG. 3 is a schematic diagram of an example of a buck converter with a guaranteed minimum switching frequency used in pulse-skip mode. The buck converter 300 includes an input voltage source 310, which could be a battery or some other type of DC power source. In one embodiment, a typical voltage range for the input voltage source could be from 2.2V to 4.9V. The input voltage source 310 is coupled to the source of a PMOS transistor 312, which is the high side switch, and to one input of a sampling voltage-to-current converter 368 which samples the current flowing through transistor 312. The drain of transistor 312 is coupled to one side of an inductor 316 and to the drain of the low side switch, NMOS transistor 314, whose source is electrically connected to ground. The drain of transistor 312 is also coupled to a second input of the sampling voltage-to-current converter 368. The gates of transistors 312 and 314 are controlled by output signals 332 and 334, respectively, of gate driver circuit 342. The other side of inductor 316 is $V_{OUT}$ node 340 and is coupled to one side of capacitor 318, whose other side is electrically connected to ground.

The buck converter load is represented by the load resistor 320. In other embodiments, the buck converter could use a voltage control, current control, or a combination of both to regulate the output voltage at $V_{OUT}$ 340 from the input voltage source 310 under a given buck converter load 320.

The buck converter further includes a state machine 344 with outputs HS_ON 382 and LS_ON 384 which are coupled to the gate driver circuit 342 that drives the gates of the high side switch 312 using gate control signal 332 and the low side switch 314 using gate control signal 334. There are five inputs to the state machine 344. The first input is the SKIP input 386 and is derived at comparator 364 from comparing a feedback voltage 330, which is a scaled version of the output voltage 340, to an internal reference voltage 336 using comparator 360, putting the output through a voltage to current converter 362, then comparing that output to a signal 302 from a logic block 394 representing a function of the voltage at the input voltage source 310 and output voltage at node 340.

The second input to the state machine 344 is a clock signal generated by an oscillator 348 operating at a fixed frequency. The third input to the state machine 344 is ZERO_COMP 378 which is the output of a comparator 388 whose inputs are the source and drain of transistor 314.

The fourth input to the state machine 344 is PEAK_COMP 372 which is the output of a comparator 376 whose inputs are the sampling voltage to current converter 368 summed with a slope compensator 374 and the voltage to current converter 362. The fifth input to the state machine 344 is FPWM 380 which is the output of a programmable register 370 and is a user-specific setting (FPWM) 380 to choose between CCM only and CCM or DCM operation.

Figure 4:
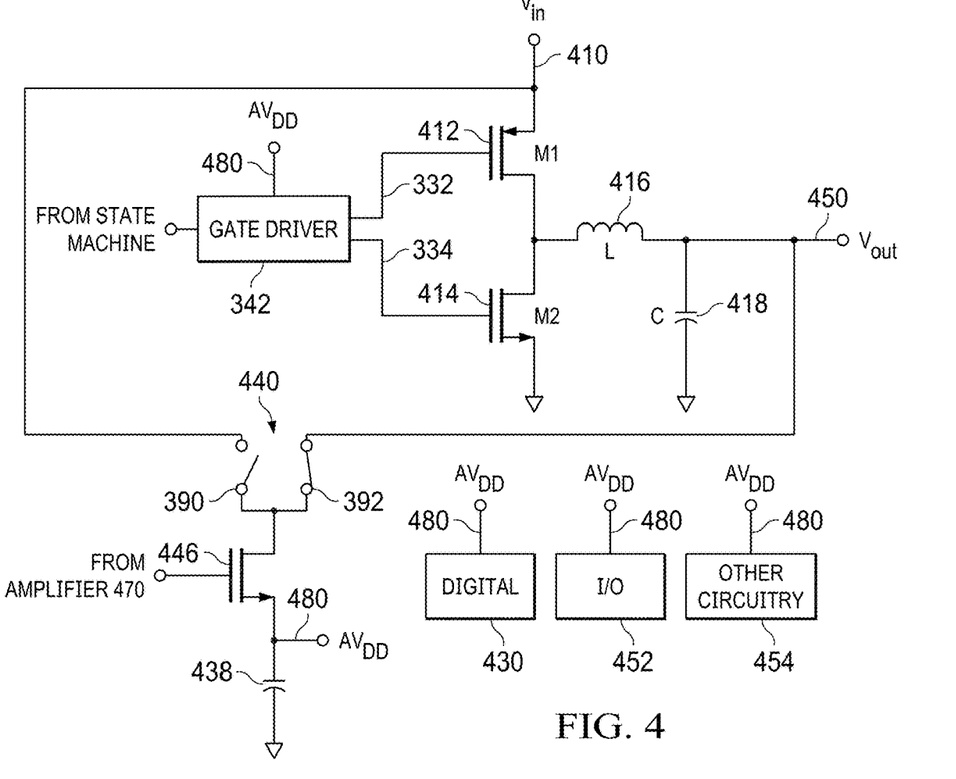
FIG. 4 shows a simplified representation for an example of the claimed buck converter with an internally powered logic LDO.

FIG. 4 shows a simplified representation for one example of the claimed buck converter with an internally powered logic LDO of FIG. 3. The input supply voltage source 410 supplies the source terminal of high side switch 412 and is coupled to one input of supply multiplexer 440. Supply multiplexer 440 is shown in FIG. 4 as ideal switches, but could be two transistors or any type of multiplexer integrated circuit. Supply multiplexer 440 selects between the input supply voltage source 410 and the output of the buck converter, $V_{OUT}$ 450 as the supply source for generating internal supply voltage $AV_{DD}$ which is used as the supply voltage for the buck converter's digital circuitry 430, input/output circuitry 452 and other circuitry 454.

The drain of high side switch 412 is coupled to one side of an inductor 416 and to the drain of the low side switch 414, whose source is electrically connected to ground. The other side of inductor 416 is coupled to one side of capacitor 418, whose other side is electrically connected to ground. The node where inductor 416 and capacitor 418 are coupled together also provides the buck converter output voltage $V_{OUT}$ 450. The buck converter output voltage $V_{OUT}$ 450 is also coupled to a second input of the supply multiplexer 440.

The schematic of FIG. 4 consists conceptually of the buck converter from FIG. 1 with an additional LDO circuit for generating an internal supply voltage for powering the buck converter's digital circuitry 430, input/output circuitry 452 and other circuitry 454. The LDO circuit is supplied by either the input supply voltage source 410 or the output voltage of the buck converter $V_{OUT}$ 450, depending upon which of the two inputs are selected in the supply multiplexer 440. The control signals 390 and 392 for the supply multiplexer 440 which selects between the two inputs comes from logic block 394 in FIG. 3.

The control signals 390 and 392 for supply multiplexer 440 always select the output voltage of the buck converter $V_{OUT}$ 450 as the supply source for generating internal logic supply voltage $AV_{DD}$ except in cases where the output voltage of the buck converter $V_{OUT}$ 450 is too low to support the generation of internal logic supply voltage $AV_{DD}$. This logic signal controlling supply multiplexer 440 could be the output of comparator 360 or another signal derived from it. In the case where the output voltage of the buck converter $V_{OUT}$ 450 is too low to support the generation of internal logic supply voltage $AV_{DD}$, the logic signal controlling supply multiplexer 440 will select the input supply voltage source 410 to supply the generation of internal logic supply voltage $AV_{DD}$.

The internal logic supply voltage $AV_{DD}$ 480 is coupled to and provides the supply voltage for the buck converter's digital circuitry 430, input/output circuitry 452 and any other circuitry 454 internal to the buck converter device which the designer may choose to power from this source. It powers the state machine 344 that feeds the gate driver 342. Normally, loading a buck converter with such circuitry would be undesirable because it would reduce the converter's efficiency by increasing the switching frequency. However, in this case, the extra loading is only added when the converter needs to switch, so the energy for the supply is virtually free, thus increasing the overall efficiency of the converter.

Figure 5:
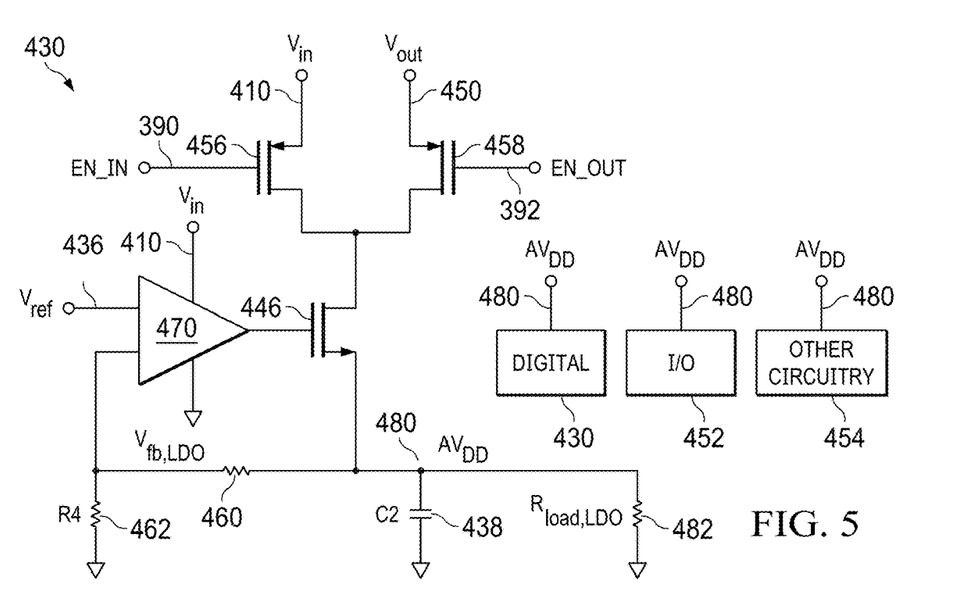
FIG. 5 shows a schematic for an example of the logic LDO block of the claimed buck converter with an internally powered LDO.

A more detailed schematic of the logic LDO block is shown in FIG. 5. The LDO consists of pass transistor 446, an output capacitor 438, a feedback path voltage divider with resistors 460 and 462, and amplifier 470 with inputs from a voltage reference 436 and the voltage divider feedback from resistors 460 and 462. The LDO output voltage node is $AV_{DD}$ 480 and the load on the LDO is represented by resistor 482. The PMOS transistors 456 and 458 represent the supply multiplexer 440 which selects between the input supply voltage source 410 and the output of the buck converter, $V_{OUT}$ 450. The gate of transistor 456 is coupled to the EN_IN signal 390 from logic block 394 in FIG. 3. EN_IN 390 and EN_OUT 392 are derived by comparing the difference between the output of the buck converter $V_{OUT}$ 450 and the input voltage $V_{IN}$ 410. The gate of transistor 458 is coupled to the EN_OUT signal 392 from logic block 394. EN_IN 390 and EN_OUT 392 combine to connect either the input supply voltage source 410 to the drain of pass transistor 446 by enabling PMOS transistor 456, or the buck converter output voltage 450 to the drain of pass transistor 446 by enabling PMOS transistor 458. The selection signal to enable PMOS transistor 458, EN_OUT 392, triggers as soon as the buck converter output voltage 450 exceeds the sum of the LDO output voltage $AV_{DD}$ 480 plus the voltage drop across pass transistor 446.

In this manner, the buck converter re-uses the energy from its output, $V_{OUT}$ 450, to supply itself when the load requirement falls below a minimum threshold rather than dumping the energy to ground through a dummy load, thus wasting that energy. In this way, the buck converter output is used as a logic supply in combination with an internal logic LDO to meet the specification that the buck converter always switches at or above a given minimum switching frequency while achieving a low output voltage ripple.

Repeating the calculation from above to determine the maximum number of pulses that can be skipped while meeting a minimum sampling frequency specification of 400 KHz to satisfy the requirement imposed by systems with capacitive touch screens, and keeping the oscillator clock frequency at 1.5 MHz, the maximum number of pulses that can be skipped is 3.

400 KHz=1.5 MHz/Number Pulses

⇨ Max Number of Pulses to Skip=1.5 MHz/400 KHz=3.75→3

Figure 6:
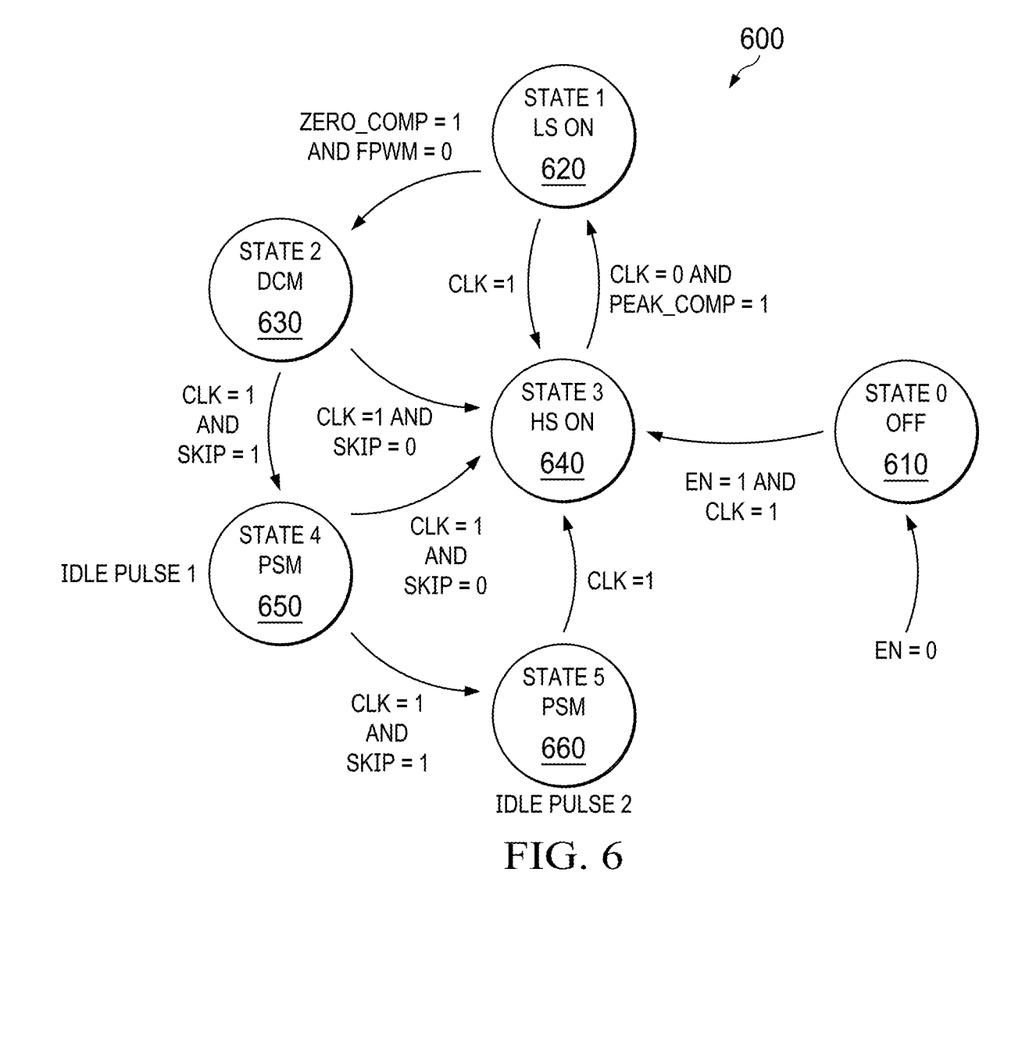
FIG. 6 shows a simplified state diagram for an example of an asynchronous converter state machine for the logic LDO block of the buck converter with an internally powered LDO.

A state diagram for an asynchronous converter state machine 600 to realize a PSM mode that allows skipping no more than two consecutive pulses is shown in FIG. 6. While the state machine in this embodiment is designed for a maximum of two consecutive pulses skipped, the state machine can be modified for any desired number of required maximum number of skipped pulses based on the frequency of the oscillator used and the required minimum switching frequency. For the example buck converter with a 1.5 MHz oscillator clock, the minimum switching frequency is 500 KHz. This is higher than the required minimum switching frequency of 400 KHz to avoid disrupting capacitive touchscreens and also achieves a low output voltage ripple. Hence, the state machine is well suited for use in a buck converter supplying a display.

The asynchronous converter state machine 600 is realized in the circuitry shown as the state machine block 344 in FIG. 3. Beginning with step 610 in FIG. 6, the converter is enabled with a global enable (EN) signal 396 from register 370 and a rising clock (CLK) 398 from oscillator 348. Each switching cycle in the peak-current-controlled system starts with a high side switch 312 on time, step 640, which is indicated by State 3 (HS ON).

As soon as the peak current reference is triggered by the sensed current through inductor 316, the current comparator signal (PEAK_COMP) 372 triggers and switches from high side conduction, State 3, to low side conduction, State 1, step 620 to discharge the inductor 316. This is done by switching off high side switch 312 and switching on low side switch 314. To guarantee a fixed frequency in any transient condition, a maximum on time is achieved by also triggering on the falling edges of CLK 398.

CCM operation occurs only in State 1, step 620, and in State 3, step 640. From State 1, step 620, the state machine can either enter State 2, step 630 or go back to State 3, step 640. With the next zero-current-detection (ZERO_COMP) 378 and a user-specific setting (FPWM) 380 to choose between CCM only and CCM or DCM operation, State 2, step 630 is entered as soon as the inductor current crosses zero, before the CLK triggers.

The state machine leaves State 2, step 630, on the next CLK cycle. Next, either another inductor charge period begins with State 3, step 640, or else the next pulse is skipped by entering State 4, step 650. The decision is determined by the value of the pulse-skip-mode signal (SKIP) 386, which is derived from the output voltage discharge during DCM mode and comparing $V_{IN}$ to $V_{OUT}$ in comparator 364. The next CLK cycle during State 4, step 650, once again decides whether to skip another pulse and enter State 5, step 660, for a second idle pulse or else to go back to the inductor charge period in State 3, step 640. After the second pulse is skipped in State 5, step 660, the next CLK cycle forces the converter to switch again in order to maintain the minimum switching frequency.

The transition from State 2 (620) to State 4 (650) to State 5 (660) produces the first and second skipped pulses. The transition from State 5 (660) to State 3 (640) forces the buck converter to switch. In this manner, the state machine ensures that no more than two consecutive clock cycles are skipped. The state machine will only enter State 4 (650) or State 5 (660) if the current draw from the output load 320 is very low. Otherwise, the state machine will remain in the normal operation states of State 1 (620), State 2 (630), and State 3 (640) when the load current required is higher, and no pulses will be skipped.

The terms "substantially the same," "substantially equal," and "approximately the same" purport to describe a quantitative relationship between two objects. This quantitative relationship may prefer the two objects to be equal by design but with the anticipation that a certain amount of variations can be introduced by the fabrication process.

While operations are depicted in the drawings in a particular order, this should not be understood as requiring that all illustrated operations be performed to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. A buck voltage converter comprising:
   a high side switch having a first terminal coupled to an input voltage source and having a second terminal;
   a low side switch having a first terminal coupled to ground, and having a second terminal coupled to the second terminal of the high side switch;
   an inductor having a first terminal coupled to the second terminal of the high side switch and the second terminal of the low side switch, and having a second terminal coupled to a buck output of the buck voltage converter;
   a capacitor having a first terminal coupled to the buck output of the buck voltage converter and the second terminal of the inductor, and having a second terminal coupled to ground;
   a gate driver circuit having a first output coupled to a gate terminal of the high side switch and a second output coupled to a gate terminal of the low side switch; and
   a voltage regulator circuit powering circuitry internal to the buck voltage converter including:
   a multiplexer having a first multiplexer input coupled to the input voltage source, a second multiplexer input coupled to the buck output of the buck voltage converter, and one or more multiplexer control inputs to select which of the two multiplexer inputs is coupled to a multiplexer output; and
   a pass transistor having a first terminal coupled to the multiplexer output and having a second terminal coupled to a regulator output of the voltage regulator.

2. The buck voltage converter of claim 1, in which only the regulator output of the voltage regulator powers the circuitry for a state machine and an internal logic circuit of the buck voltage converter.

3. The buck voltage converter of claim 2, in which the regulator output is capacitively coupled to ground.

4. The buck voltage converter of claim 2, in which the one or more multiplexer control inputs are derived from comparing the buck output with the input voltage source.

5. The buck voltage converter of claim 2, in which the multiplexer includes two transistors.

6. The buck voltage converter of claim 5, in which the transistors include a p-channel field effect transistor and an n-channel field effect transistor.

7. The buck voltage converter of claim 2, in which the voltage regulator circuit includes an amplifier having a first input coupled to a voltage reference, a second input coupled to the regulator output of the voltage regulator circuit through a first resistor and to ground through a second resistor, and an output coupled to a gate terminal of the pass transistor.

8. A state machine comprising:
   a Skip input signal derived by subtracting a scaled version of a buck output of a buck voltage converter from a reference voltage, and comparing an output of that subtraction to a signal representing a difference between an input supply voltage and the buck output;
   a Zero_Comp input signal that is an output of a comparator whose inputs are a first terminal and a second terminal of a low side switch;
   a FPWM input signal that is a setting to choose between continuous conduction mode (CCM) only and CCM or discontinuous conduction mode (DCM) operation;
   a Peak_Comp input signal that is an output of a comparator with a first input representative of an amount of current drawn from an input voltage source, and a second input representative of a difference between the buck output and the reference voltage;
   an EN input signal that enables the buck voltage converter;
   a HS output coupled to a gate driver circuit that controls a high side switch; and
   a LS output coupled to the gate driver circuit that controls the low side switch.

9. The state machine of claim 8, in which the state machine:
   determines a maximum number of consecutive pulses that can be skipped;
   enables the buck voltage converter with the EN input signal and a clock edge;
   switches on the high side switch using the HS output and provides power from the input voltage source to a load through an inductor, and continuously monitors an inductor current;
   discharges the inductor by switching off the high side switch using the HS output and switching on the low side switch using the LS output after a peak current reference level is reached in the inductor current;
   determines whether the inductor current has reached zero;
   switches off the low side switch using the LS output and switches on the high side switch using the HS output if the inductor current has reached zero, or else skips a first pulse using the Skip input signal if the inductor current has not reached zero;
   determines on a next clock cycle if the inductor current has reached zero and if the maximum number of consecutive pulses that can be skipped has been reached;
   switches off the low side switch using the LS output and switches on the high side using the HS output switch if the inductor current has reached zero or if the maximum number of consecutive pulses that can be skipped has been reached, or else skips a second pulse using the Skip input signal if the inductor current has not reached zero and the maximum number of consecutive pulses that can be skipped has not been reached.

10. The state machine of claim 9, in which the maximum number of consecutive pulses that can be skipped is determined by dividing an oscillator frequency by a minimum switching frequency.

11. The state machine of claim 9, in which the maximum number of consecutive pulses that can be skipped is two.

12. A buck voltage converter comprising:
a high side switch having a first terminal coupled to an input voltage source and having a second terminal;
a low side switch having a first terminal coupled to ground, and having a second terminal coupled to the second terminal of the high side switch;
an inductor having a first terminal coupled to the second terminal of the high side switch and second terminal of the low side switch, and having a second terminal coupled to a buck output of the buck voltage converter;
a capacitor having a first terminal coupled to the buck output and the second terminal of the inductor, and having a second terminal coupled to ground;
a gate driver circuit receiving inputs from a state machine and having outputs coupled to a gate terminal of the high side switch and a gate terminal of the low side switch; and
a voltage regulator circuit powering circuitry internal to the buck voltage converter including:
a multiplexer having a first multiplexer input coupled to the input voltage source, a second multiplexer input coupled to the buck output, and one or more multiplexer control inputs to select which of the two multiplexer inputs is coupled to a multiplexer output; and
a pass transistor having a first terminal coupled to the multiplexer output and having a second terminal coupled to a regulator output of the voltage regulator.

13. The buck voltage converter of claim 12, in which only the regulator output of the voltage regulator powers the circuitry for the state machine and an internal logic circuit circuitry of the buck voltage converter.

14. The buck voltage converter of claim 12, in which the state machine includes:
a Skip input signal derived by subtracting a scaled version of the buck output from a reference voltage, and comparing an output of that subtraction to a signal representing a difference between an input supply voltage and the buck output;
a Zero_Comp input signal that is an output of a comparator whose inputs are the first terminal and second terminal of the low side switch;
a FPWM input signal that provides a setting to choose between continuous conduction mode (CCM) only and CCM or discontinuous conduction mode operation;
a Peak_Comp input signal that is an output of a comparator with a first input representative of an amount of current drawn from the input voltage source, and a second input representative of the difference between the buck output and the reference voltage;
an EN input signal that enables the buck voltage converter;
an HS output coupled to the gate driver circuit that controls the high side switch; and
an LS output coupled to the gate driver circuit that controls the low side switch.

15. The buck voltage converter of claim 14, in which the state machine:
determines a maximum number of consecutive pulses that can be skipped;
enables the buck voltage converter with the EN input signal and a clock edge;
switches on the high side switch using the HS output and provides power from the input voltage source to a load through the inductor, and continuously monitors an inductor current;
discharges the inductor by switching off the high side switch using the HS output and switching on the low side switch using the LS output after a peak current reference level is reached in the inductor current;
determines whether the inductor current has reached zero;
switches off the low side switch using the LS output and switches on the high side switch using the HS output if the inductor current has reached zero, or else skips a first pulse using the Skip input if the inductor current has not reached zero;
determines on a next clock cycle if the inductor current has reached zero and if the maximum number of consecutive pulses that can be skipped has been reached;
switches off the low side switch using the LS output and switches on the high side using the HS output switch if the inductor current has reached zero or if the maximum number of consecutive pulses that can be skipped has been reached, or else skips a second pulse using the Skip input if the inductor current has not reached zero and the maximum number of consecutive pulses that can be skipped has not been reached.

16. The buck voltage converter of claim 14, in which a maximum number of consecutive pulses that can be skipped is determined by dividing an oscillator frequency by a minimum switching frequency.

17. The buck voltage converter of claim 14, in which a maximum number of consecutive pulses that can be skipped is two.

18. The buck voltage converter of claim 12, in which the one or more multiplexer control inputs are derived from comparing the buck output with the input voltage source.

19. The buck voltage converter of claim 12, in which the multiplexer includes a p-channel field effect transistor and an n-channel field effect transistor.

20. The buck voltage converter of claim 12, in which the voltage regulator circuit includes an amplifier having a first input coupled to the reference voltage, a second input coupled to the regulator output through a first resistor and to ground through a second resistor, and an output coupled to a gate terminal of the pass transistor.

* * * * *